(12) United States Patent
Matsuhashi et al.

(10) Patent No.: US 7,767,920 B1
(45) Date of Patent: Aug. 3, 2010

(54) SWITCH AND WELDING METHOD OF SAME

(75) Inventors: Hisashi Matsuhashi, Tokyo (JP);
Atsuko Hildebrand, Winchester, KY (US); Anthony C. Bormes, Winchester, KY (US); Kenji Amimoto, Tokyo (JP)

(73) Assignees: Niles America Wintech, Inc., Winchester, KY (US); Niles Co., Ltd., Tokyo (JP)

( * ) Notice: Subject to any disclaimer, the term of this patent is extended or adjusted under 35 U.S.C. 154(b) by 0 days.

(21) Appl. No.: 12/379,902

(22) Filed: Mar. 4, 2009

(51) Int. Cl.
*H01H 9/00* (2006.01)
(52) U.S. Cl. .................. 200/61.88; 200/293; 29/622
(58) Field of Classification Search ............. 200/61.85, 200/61.88, 293, 294, 302.1, 302.2, 302.3
See application file for complete search history.

(56) References Cited

U.S. PATENT DOCUMENTS

| | | | | |
|---|---|---|---|---|
| 5,828,023 A | * | 10/1998 | Nakazawa | 200/61.88 |
| 5,893,959 A | * | 4/1999 | Muellich | 156/272.8 |
| 5,969,313 A | * | 10/1999 | Ikeshima et al. | 200/61.88 |
| 6,057,519 A | * | 5/2000 | Taniguchi et al. | 200/61.88 |
| 6,068,416 A | * | 5/2000 | Kumamoto et al. | 400/491 |
| 6,154,107 A | * | 11/2000 | Tomotoshi | 335/205 |
| 6,791,043 B2 | * | 9/2004 | Watada et al. | 200/61.88 |
| 6,897,386 B2 | * | 5/2005 | Nakazawa et al. | 200/61.88 |
| 7,178,419 B2 | * | 2/2007 | Murakami et al. | 74/335 |
| 7,211,759 B2 | * | 5/2007 | Chou | 200/461 |
| 7,592,558 B2 | * | 9/2009 | Lima | 200/292 |
| 2007/0209922 A1 | * | 9/2007 | Lima | 200/547 |
| 2009/0173613 A1 | * | 7/2009 | Geldmacher | 200/5 A |

FOREIGN PATENT DOCUMENTS

JP  2002-192617 A  7/2002

* cited by examiner

*Primary Examiner*—Michael A Friedhofer
(74) *Attorney, Agent, or Firm*—Rader, Fishman & Grauer PLLC

(57) ABSTRACT

A switch comprises a switch housing including a cover and a terminal block coupled with the cover. The cover is formed of a colored, laser transmissive material and the terminal block is formed of a laser non-transmissive material. A thin part is circularly formed in the cover formed of the colored laser transmissive material on the periphery side of the switch housing and is thinner than another part of the cover and a thermal welding part is circularly formed along the thin part by means of a laser beam for coupling the terminal block with the cover.

13 Claims, 6 Drawing Sheets

(a)

(b)

SWITCH AND WELDING METHOD OF SAME

BACKGROUND OF THE INVENTION

1. Field of the Invention

The present invention relates to a switch provided with a terminal block, a cover coupled with the terminal block and a position detector therein, such as an inhibitor switch for electrically detecting a shift position of an automatic transmission, and a welding method of the switch.

2. Description of Related Art

Examples of inhibitor switches in accordance with related art are shown in cross sectional views of FIG. 9. As shown in FIG. 9, an inhibitor switch 101 is composed of a terminal block 103, a cover 105, and a moving block 107.

The terminal block 103 has a plurality of fixed contact points 109. The terminal block 103 is coupled with the cover 105 to form a switch housing 111. A contact accommodating chamber 113 is formed inside the switch housing 111. The terminal block 103 and the cover 105 are coupled in a thermal welding part 115 by, for example, ultrasonic welding.

In the thermal welding part 115, a share joint is used to ensure high welding strength. The share joint allows a circular projected rib 119 on the side of the cover 105 to be guidably fitted all around a circular welding groove 117 on the side of the terminal block 103 at the corresponding portion of the thermal welding part 115 before thermally welded, so that the axial centers of the terminal block 103 and the cover 105 may be aligned and the axial rotation direction thereof may be positioned around the axis of the moving block 107. The terminal block 103 and the cover 105 are vibrated by means of ultrasonic waves while being pressed against each other at this positioning state. As a result, the projected rib 119 and the welding groove 117 are thermally welded, achieving reliable ultrasonic welding.

In the ultrasonic welding, however, glass fibers 118 in a resin material develop a tendency to lie in parallel to a welding surface at welding due to ultrasonic vibrations, as shown in FIG. 10, leading to easy formation of partial gaps 120. For this reason, to ensure air-tightness inside of the switch housing 111, a packing 121 is required to be attached on the inner periphery of the thermal welding part 115.

Thus, the ultrasonic welding involves a step for assembling the deformable packing 121, making an automated assembly process difficult. Besides, no-good work pieces may be produced, for example, in fitting the packing 121. Yet, the press pressure between the terminal block 103 and the cover 105 during the assembly process becomes high because of use of the packing 121. This means that high energy is required during the ultrasonic welding step, which produces serious noise, placing pressure on field workers.

To avoid this problem, for example, it has been assumed that the cover 105 is formed of a laser transmissive material and the terminal block 103 is formed of a laser non-transmissive material, and a laser beam is irradiated from the side of the cover 105 onto the side of the terminal block 103 for thermal welding.

On the other hand, when the cover 105 is formed of a laser transmissive material alone, the cover 105 requires a given thickness to ensure the rigidity of the cover 105 itself and thereby, 40% or higher of transmission factor is needed to transmit the laser beam into the laser non-transmission material at the corresponding portion of the thermal welding part 115.

Accordingly, this method in accordance with the related art has a disadvantage in that even though the cover 105 is colored by an adjusted amount of pigment, a visible light passes through to the switch housing 111 and any dirt attached over time to the inner surface thereof and sparks generated when the switch is turned on/off become visible from the outside. This disadvantage is especially prominent in switches, which are required to turn on/off a large current, as in the case of an inhibitor switch for detecting the shift position of the automatic transmission of an automobile (refer to JP2002-192617A or U.S. Pat. No. 5,893,959).

As described above, the conventional switch has the following problem. When one of the cover and the terminal block is formed of a laser transmissive material alone and a laser beam is irradiated onto the other of them for thermal welding, the cover and the terminal block each are required to have a given thickness to ensure their rigidity. On the other hand, since the one of the cover and the terminal block requires a sufficiently high laser transmission rate to pass through a laser beam to the switch housing, the laser transmissive material is required to be colored for a visible light ray to pass through. In consequence, any dirt attached to the inner surface thereof and sparks generated in a structure equipped with contact points are inevitably visible from the outside.

In view of the above, there exists a need for a switch and a welding method of the switch which overcome the above mentioned problems in the conventional art. The present invention addresses this need in the conventional art as well as other needs, which will become apparent to those skilled in the art from this disclosure.

SUMMARY OF THE INVENTION

The present invention is made in view of the foregoing problems and it is an object of the present invention to provide a switch provided with a terminal block, a cover coupled with the terminal block and a position detector disposed therein, and a welding method of the switch, which can perform a secure thermal welding.

According to a first aspect of the present invention, a switch comprises a switch housing including a cover and a terminal block coupled with the cover, a moving block provided with an operation portion and movable to the switch housing, and a detector for detecting a movement of the operation portion between the switch housing and the moving block, wherein one of the cover or the terminal block is formed of a colored, laser transmissive material and the other is formed of a laser non-transmissive material, a thin part is circularly formed in the cover or the terminal block formed of the colored laser transmissive material on the periphery side of the switch housing and is thinner than another part of the cover or the terminal block, and a thermal welding part is circularly formed along the thin part by means of a laser beam for coupling the terminal block with the cover.

According to a second aspect of the present invention, a welding method of a switch provided with a switch housing including a cover and a terminal block coupled with the cover, a moving block provided with an operation portion and movable to the switch housing, and a detector for detecting a movement of the operation portion between the switch housing and the moving block, comprising forming one of the cover or the terminal block with a colored, laser transmissive material and the other with a laser non-transmissive material, disposing a thin part circularly in the cover or the terminal block formed of the colored laser transmissive material on the periphery side of the switch housing and thinner than another part of the cover or the terminal block, and providing a thermal welding circularly between the terminal block and the cover by irradiating a laser beam along the thin part for coupling the terminal block with the cover.

ADVANTAGE OF THE INVENTION

According to the above construction, a sufficient laser transmission rate for welding at the thin part can be acquired even though the laser transmission rate of the cover formed of the colored laser transmissive material is low to some degree, achieving reliable thermal welding.

Accordingly, the cover formed of the colored laser transmissive material can secure the sufficient thickness and therefore, prevent a visible light from passing through the cover and thereby, any dirt changing over time and sparks generated inside the switch housing, if the switch structure has contact points therein, become invisible from the outside.

The above method allows a sufficient laser transmission rate to be ensured in the thin part by the above construction even though the laser transmission rate of the cover or the terminal block formed of the colored laser transmissive material is low to some degree, achieving reliable thermal welding.

Thus, the cover or the terminal block formed of the colored laser transmissive material is capable of blocking a visible light, making it possible for any dirt changing over time and sparks generated inside of the switch housing to be invisible from the outside.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DETAILED DESCRIPTION OF THE EXAMPLE EMBODIMENTS

First Embodiment

Overall structure of a switch device

Figure 1:
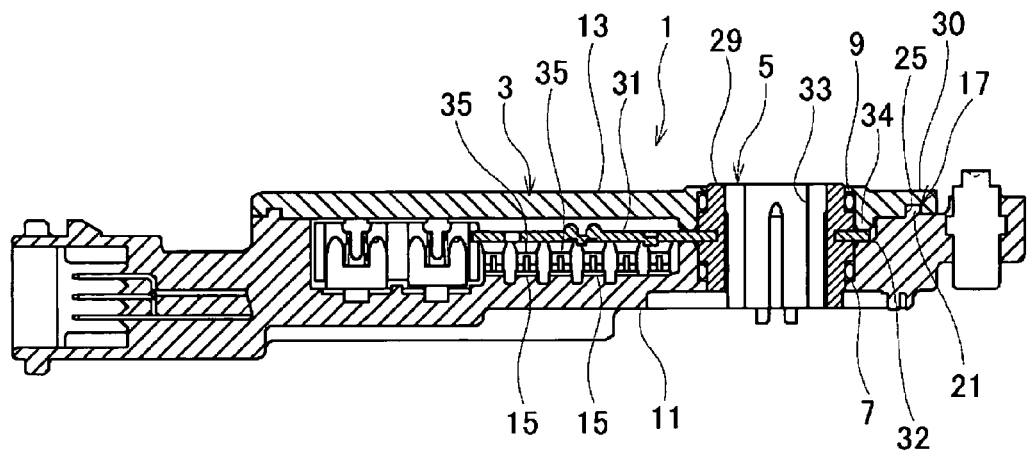
FIG. 1 is a cross sectional view showing an inhibitor switch. In a first embodiment of the present invention.
Figure 2:
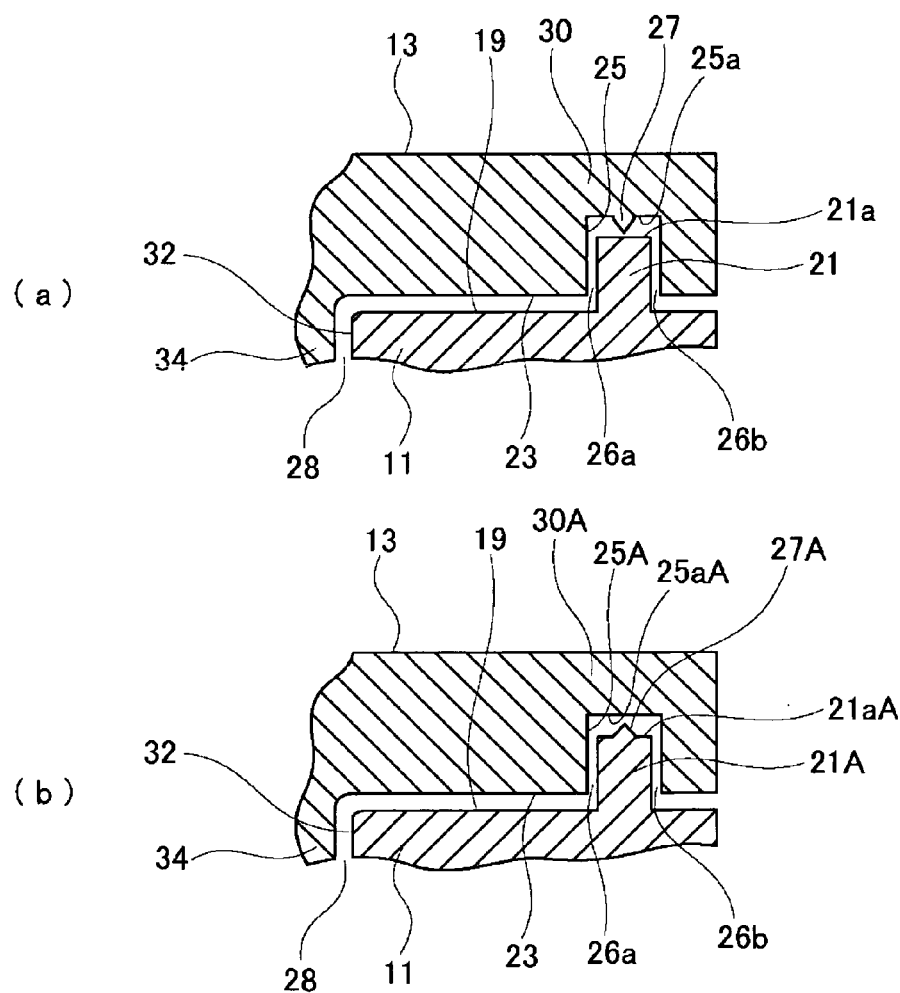
FIGS. 2(a) and 2(b) are enlarged partial views each showing a different example of a portion corresponding to a thermal welding part before welding in the first embodiment.
Figure 3:
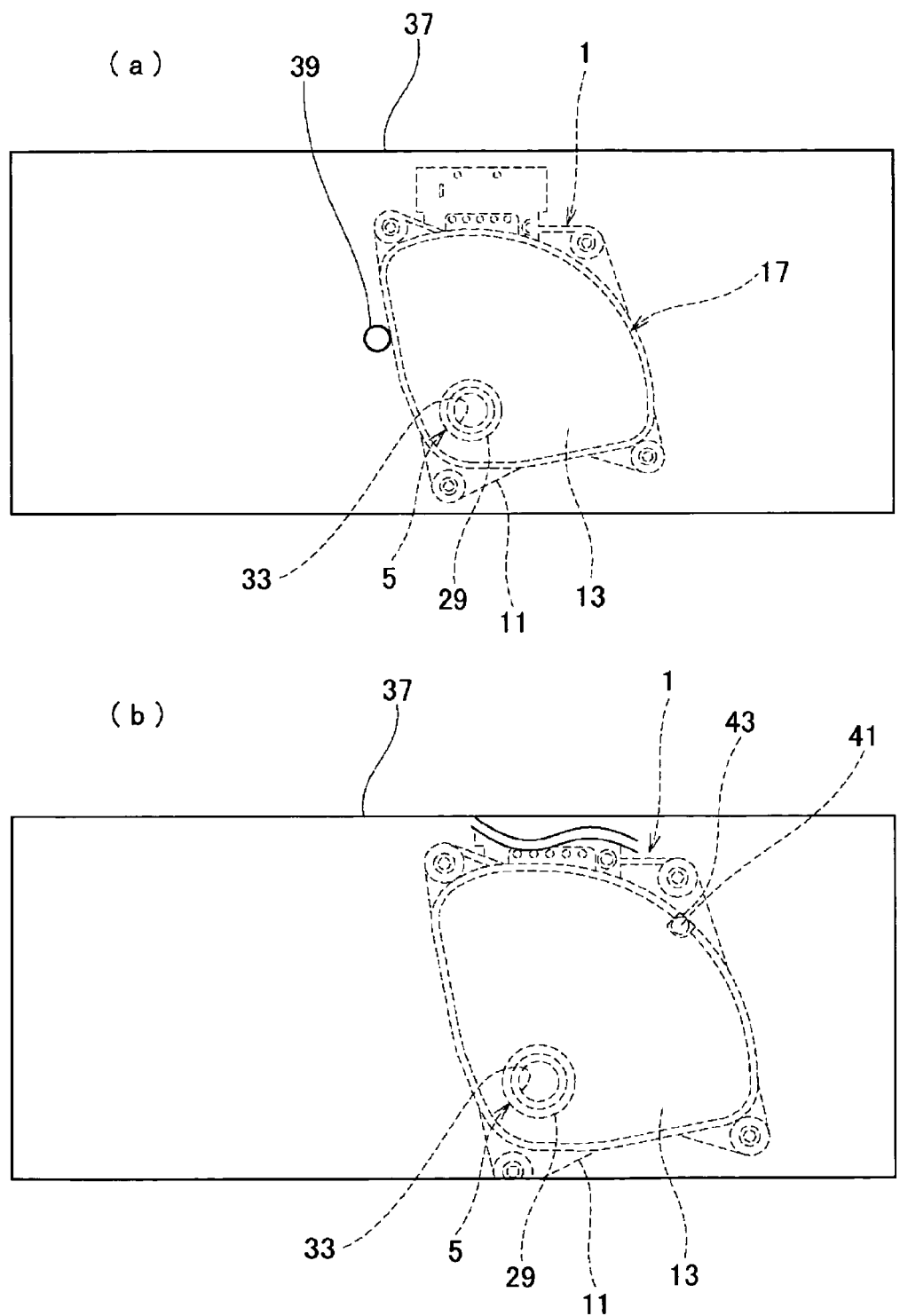
FIGS. 3(a) and 3(b) are plan views each showing a different example in regard to the positioning of a switch housing in the first embodiment.

FIG. 1 is a cross-sectional view showing an inhibitor switch in a first embodiment of the present invention. FIGS. 2(a) and 2(b) are enlarged partial cross sectional views each showing a different example before welding at a portion corresponding to a thermal welding part. FIGS. 3(a) and 3(b) are each showing a different example in regard to the positioning of a switch housing.

As shown in FIG. 1, an inhibitor switch 1, acting as a switch itself, is composed of a switch housing 3, a moving block 5, and seal rings 7 and 9.

The switch housing 3 has a terminal block 11 and a cover 13 welded therein and a plurality of fixed contact points 15 on the inside of the terminal block 11 therein as a detector.

The terminal block 11 is formed of a laser non-transmissive material. Any resin, for example nylon, is used for the laser non-transmissive material and the terminal block 11 is adapted to absorb a laser beam by adjusting a blending rate of an additive such as a black pigment to induce heat generation.

The cover 13 is formed of a colored laser transmissive material. Any resin, for example nylon, is used for the laser transmissive material and the cover 13 is adapted to absorb a laser beam by adjusting a blending rate of an additive such as a blue pigment, so that the laser beam passes through a thin part, but does not pass through any portion other than the thin part, which will be described later.

In this way, the cover 13 is blue colored while the terminal block 11 is block colored, making it possible to visually identify them definitely and thereby, in a switch assembly process, the colored cover 13 can be clearly confirmed to reliably irradiate a laser beam through the thin part to be described later. In addition, a blue pigment is added to the material of the cover 13 so as to block a visible light, making it possible for any dirt adhered over time and sparks generated inside of the switching housing 3 to be invisible from the outside.

It may be possible to form the cover 13 of a black colored material identical to that of the terminal block 11 so as for the cover 13 to be transparent or half-transparent.

The peripheries of the terminal block 11 and the cover 13 are circularly welded in a thermal welding part 17 by means of a laser beam as shown in FIGS. 1, 3(a) and 3(b).

The portion corresponding to the thermal welding part 17 is formed as shown in FIGS. 2(a) and 2(b) before welding. This means that as shown in FIG. 2(a), a flat terminal block abutting surface 19 is circularly formed on the periphery of the terminal block 11 and a projecting rib 21 is circularly formed along the terminal block abutting surface 19. On the periphery of the cover 13, a cover side abutting surface 23 is formed, and a welding groove 25 is circularly formed on the cover side abutting surface 23.

The formation of the welding groove 25 described above allows a thickness of the cover 13 to be thinly formed in the portion corresponding to the thermal welding part 17 to form a thin part 30 of the cover 13, thus enabling a laser beam to easily pass therethrough. In this embodiment, the thickness of the thin part 30 is larger than or equal to 1 mm and less than or equal to 2 mm, which is thinner than the conventional thickness of 3 mm and the thickness of other parts of the cover 13. Accordingly, a laser transmission rate of the part other than the thin part 30 can be up to the order of 15%, so that a laser beam passes through the thin part 30 but a visible light can not pass not through the parts other than the thin part 30. The laser beam does not necessarily pass through the part other than the thin part 30 without mentioning.

On an inner wall surface 25a of the welding groove 25, a welding projection 27 is circularly formed along the welding groove 25. The projecting rib 21 fits in the welding groove 25, and gaps 26a and 26b are formed between the outer periphery of the projecting rib 21 and the inner periphery of the welding groove 25 in a radial direction relative to the rotation axis of the moving block 5.

In FIG. 2(b), on a top surface 21aA of a projecting rib 21A, a welding projection 27A is formed, and an inner wall 25aA of a welding groove 25A on the cover side has a flat surface with a thin wall part 30A of the cover 13 formed therein. Gaps 26a and 26b formed radially between the projecting rim 21A and the welding groove 25A are identical to those shown in FIG. 2(a).

The terminal block 11 has a circular concave portion 32 co-axial with the rotation axis, in which a circular projection 34 of the cover 13 fits, forming a gap 28 between the circular concave portion 32 and the circular projection 34 so as to move radially relative to the rotation axis of the moving block 5.

It should be noted that the projection 34 of the cover 13 serves as a holding member of a contact support plate 31 and ensures the rigidity of the region around an opening of the cover 13, and the circular concave portion 32 on the terminal block 11 is formed to avoid collision against the projection 34.

The moving block 5 is formed of a resin material, for example nylon, and is composed of a boss 29 of a fitting part (operation portion) and the contact support plate 31. The boss 29 is rotatably supported by means of the terminal block 11 and the cover 13. The seal rings 7, 9 are attached between the inner peripheries of each of the terminal block 11 and the cover 13, and the outer periphery of the boss 29. The seal rings 7, 9 are formed of rubber such as an elastic O-ring. A fitting hole 33 having a double-side width is formed in the boss 29. The manual shaft (not shown) of an automatic transmission is fitted in the fitting hole 33.

The contact support plate 31 extends into the switch housing 3. On the contact support plate 31, a plurality of movable contact points 35 corresponding to the fixed contact points 15 are supported as a detector.

The fixed contact points 15 and the movable contact points 35 enable rotational transfer of the boss 29 as the operation portion between the switch housing 3 and the moving block 5 to be detected.

Assembly Process

Grease is applied to the moving block 5 and the seal ring 9 is attached on the periphery of the boss 29.

The moving block 5 is built in the cover 13 and the seal ring 7 is attached on the periphery of the boss 29.

The terminal block 11 is assembled in the cover 13 coupled with the moving block 5 so that the terminal block abutting surface 19 of the terminal block 11 faces the cover abutting surface 23 of the cover 13.

At this time, when a top surface 21a, which defines a terminal block side, of the projecting rib 21 of the terminal block 11 loosely fits in the welding groove 25 of the cover 13, the welding projection 27 collides against the top surface 21a, thus forming a gap between the terminal abutting surface 19 and the cover abutting surface 23 as the welding part.

In this case, no force is added to the terminal block 11 and the cover 13 so as to automatically position the terminal block 11 and the cover 13 relative to the boss 29 of the moving block 5 by means of snapping force generated uniformly by the rubber rings 7, 9 in the radial direction on the entire circumference for self-centering.

The terminal block 11 and the cover 13 are positioned in their rotation direction as shown in FIGS. 3(a) and 3(b).

In FIG. 3(a), the terminal block 11 and the cover 13 are positioned in their rotation direction around the rotational axis of the moving block 5 by means of a pin 39 of a jig 37. In FIG. 3(b), the terminal block 11 and the cover 13 are positioned in their rotation direction by engaging a projection 41 extending from the terminal block 11 in a positioning groove 43 formed in the cover 13.

In this way, with the terminal block 11 and the cover 13 centered and positioned in their rotation direction, a laser beam is irradiated in the portion corresponding to the thermal welding part 17 on the periphery surface of the cover 13, namely the thin part 30 of the cover 13, while pressing force being applied between the terminal block 11 and the cover 13 by means of the jig 37.

As shown in FIG. 2(a), the laser beam passes through the thin part 30 of the cover 13 to the top surface 21a of the projecting rib 21 and is absorbed therein. The absorbed laser beam heats a laser irradiating spot and the region around it, melting the top surface 21a of the projecting rib 21. Melting heat in the top surface 21a of the projecting rib 21 is transferred to the welding projection 27 of the welding groove 25, further melting the welding projection 27.

In FIG. 2(b), the laser beam passing through the thin wall part 30 heats and melts the welding projection 27A and the region around it, and the heat is transferred to the internal surface 25aA of the welding groove 25A from the welding projection 27 for further melting.

During this melting step, a gap formed between the terminal block abutting surface 19 and the cover abutting surface 23 is filled up and at the same time, the laser beam moves to the next welding point by a constant velocity motion along the portion corresponding to the thermal welding part 17 of the laser irradiating spot, while the temperature of the previously welded part drops and the hardening begins.

In this way, the thermal welding part 17 is formed between the welding groove 25 and the projecting rim 21 on the entire circumference of the switch housing 3 when the laser beam is irradiated.

Effects of First Embodiment

The inhibitor switch 1 in the first embodiment of the present invention is compose of the switch housing 3 including the terminal block 11, the cover 13 coupled with the terminal block 11 and the plurality of fixed contact points 15 formed therein; and the moving block 5, which is built rotatably relative to the switch housing 3 and has the boss 29 for fitting the manual shaft of the automatic transmission and the plurality of movable contact points 35 corresponding to the plurality of fixed contact points 15. The cover 13 is formed of a colored laser transmissive material while the terminal block 11 is formed of a laser non-transmissive material. The thin part 30 thinner than the other parts are circularly formed on the cover 13 formed of the colored laser transmissive material and the terminal block 11 is made from the laser non-transmissive material. The thin wall part 30 thinner than the walls of other parts is circularly formed on the cover 13 formed of the colored laser transmissive material on the periphery side of the switch housing 3. The thermal welding part 17 by the laser beam is circularly formed along the thin part 30, thus coupling the terminal block 11 with the cover 13.

Accordingly, even though the laser transmission rate of the cover 13 formed of the colored laser transmissive material is low to some degree, a laser beam is capable of passing through the thin part 30, ensuring reliable thermal welding.

Thus, with its thickness ensured, the cover 13 formed of the colored laser transmissive material is capable of blocking a visible light, so that any dirt attached over time and sparks generated inside of the switching housing 3 can be made invisible.

In addition, the thin part 30 is formed by means of the welding groove 25 circularly formed on the cover 13, the projecting rib 21 fitted in the welding groove 25 is formed circularly on the terminal block 11, and the thermal welding part 17 is formed between the welding groove 25 and the projecting rib 21.

This ensures reliable welding of the thermal welding part 17 while forming the thin part 30 to ensure a sufficient laser transmission rate of the laser beam.

The thin part 30 has a thickness larger than or equal to 1 mm and less than or equal to 2 mm.

For this reason, if the laser transmission rate of the cover 13 is higher than 15%, the laser beam can pass through the thin wall part 30, ensuring reliable thermal welding.

The welding projection 27 is formed on the opposed inner wall 25a in the thin part 30 before the welding is done, and the welding projection 27 is welded while contacting the welding projection 27 with the top surface 21a of the opposed projecting rib 21, thus performing the thermal welding.

Accordingly, the welding part is definitely formed by means of the welding projection 27 for more reliable thermal welding.

Figure 4:
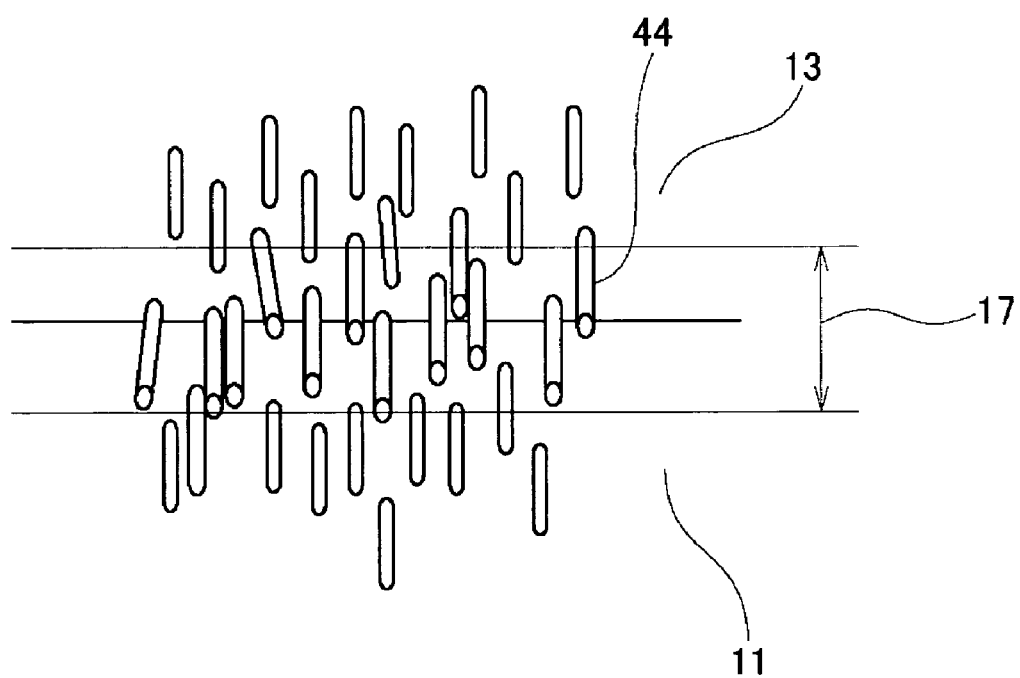
FIG. 4 is a view showing the state of glass fibers during a laser welding step in the first embodiment.
Figure 10:
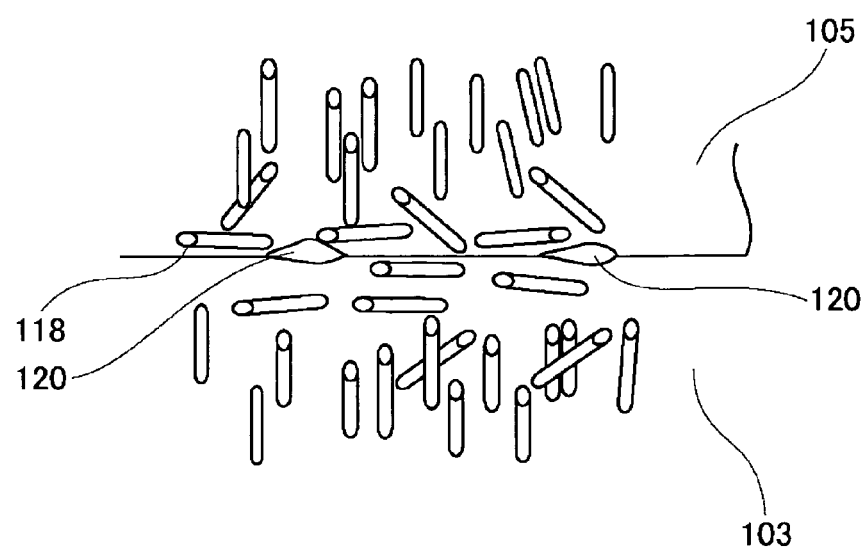
FIG. 10 is en explanatory diagram showing the state of the glass fibers during an ultrasonic welding step in the conventional art.

As shown in FIG. 4, the thermal welding part 17 between the terminal block 11 and the cover 13 is not vibrated even when glass fibers 44 are contained in the resin materials in the terminal block 11 and the cover 13, and thereby, the glass fibers 44 are kept in their original states to be difficult to lie in parallel to the welding surface. Accordingly, even in a case of containing the glass fibers in the resins, there does not occur the problem as shown in FIG. 10 that the gap is left after being welded and hardened as in the case of the ultrasonic welding process. In consequence, the welding can be reliably performed on the entire circumference. In addition, seals can be omitted from between the terminal block 11 and the cover 13.

By means of, moreover, the welding projections 27,27a, pressing pressure can be intensively applied to the melting part and also while the welding part can be ensured for more reliable thermal welding.

Unlike ultrasonic welding, in the welding method of the present embodiment, the gap is formed between the welding groove 25 and the projecting rib 21, and the terminal block 11 and the cover 13 are not positioned directly using the welding groove 25 and the projecting rib 21 in the rotation direction of the moving block 5, therefore, making it possible to facilitate the assembly operation.

Second Embodiment

Figure 5:
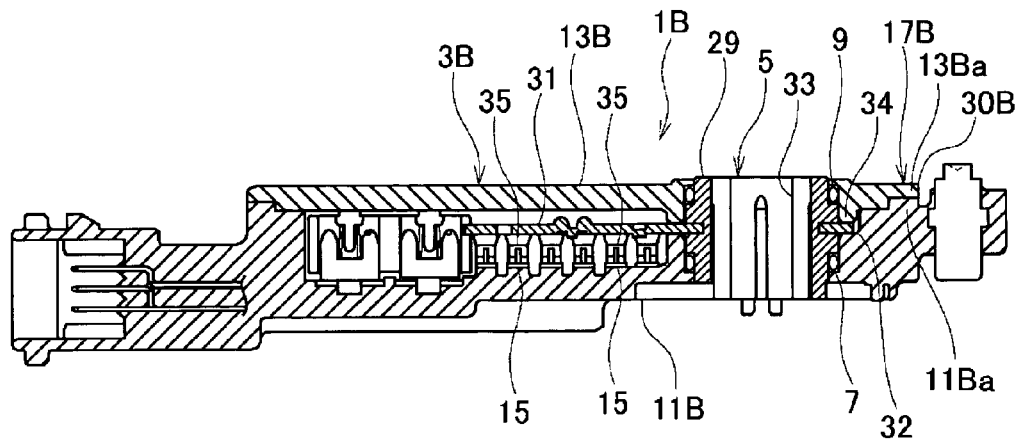
FIG. 5 is a cross sectional view showing an inhibitor switch in a second embodiment of the present invention.
Figure 6:
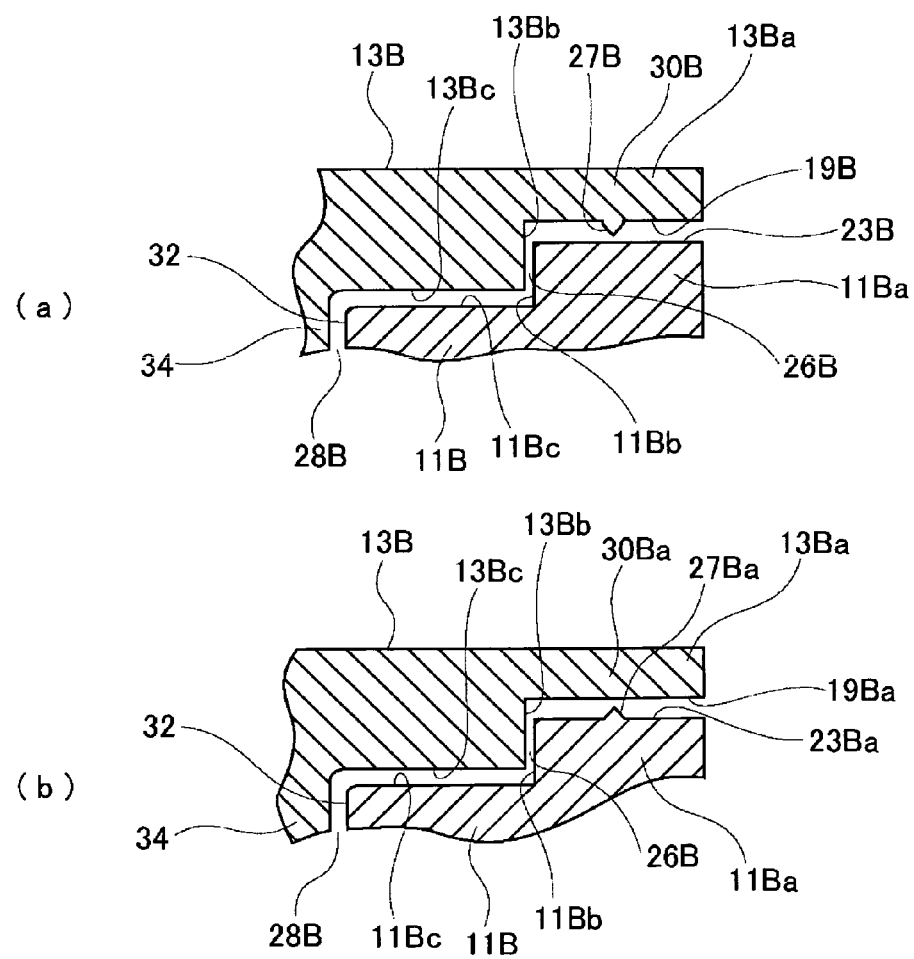
FIGS. 6(a) and 6(b) are enlarged partial views each showing a different example of a welding part before welding in the second embodiment.

FIGS. 5, 6(a) and 6(b) are views showing a second embodiment of the present invention. FIG. 5 is a cross sectional view showing an inhibitor switch and FIGS. 6(a) and 6(b) are enlarged partial cross sectional views each showing a different example of the corresponding portion of the thermal welding part before welding, showing different examples. It should be noted that the fundamental structure is identical to that of the first embodiment. Components the same as or identical to those in the first embodiment are referred to as identical numbers or identical numbers with "B" and the same explanation is omitted.

An inhibitor switch 1B in the first embodiment has a cover 13B of which an outer periphery is circularly formed as a stepped part 13Ba; and a stepped thin part 30B formed to be thinner than the other parts.

The cover 13B requires a certain level of thickness for ensuring its rigidity. For this reason, a vertical wall 13Bb forms a stepped part to ensure the thickness as the entirety of the cover 13 by forming only the joint portion as the thin part 30B.

On the outer periphery of the terminal block 11B, a thick stepped projection 11Ba is formed to match the thin part 30B, and the inner periphery of the projection 11Ba defines a vertical wall 26B opposed to the vertical wall 13Bb of the cover 13B.

In the stepped part 13Ba of the cover 13B, a cover abutting surface 19B as a welding surface is circularly formed, and in the projection 11Ba of the terminal block 11B, a terminal block abutting surface 23B as a welding surface, is circularly formed.

On the cover abutting surface 19B or the terminal block abutting surface 23B, welding projections 27B, 27Ba are circularly formed along the corresponding portion of a thermal welding part 17B, as shown in FIGS. 6(a) and 6(b).

In the assembly process, a gap is formed between the circular vertical wall 13Bb for fitting the cover 13B in the terminal block 11B and the circular vertical wall 26B for fitting the terminal block 11B in the cover 13B. The gap allows the self-centering by means of the seal rings 7, 9 without any interference as in the case of the first embodiment.

In FIG. 6(a), when a laser beam is irradiated through the thin part 30B, the laser irradiating spot and the region around it are heated and the target point of the terminal block abutting surface 23B is melted. Melting heat on the terminal block abutting surface 23B is transferred to the welding projection 27B of the cover abutting surface 19B, melting the welding part 27B.

In FIG. 6(b), when the laser beam is irradiated through a thin part 30Ba, a welding projection 27Ba and the region around it are melted by heating and the heat is transferred from the side of the welding projection 27Ba to the side of the cover abutting surface 19Ba for melting.

In this way, the thermal welding part 17B is formed between the stepped part 13Ba and the projection 11B opposed with each other to ensure reliable welding of the thermal welding part 17B.

It is preferable that at assembly, when the thermal welding parts 27B, 27Ba collide against the terminal block abutting surface 23B and the cover abutting surface 19Ba before welding, the gap between the wall surfaces 11Bc,13Bc for collision-positioning in the direction along the rotation axis of the terminal block 11B and the cover 13B has a width somewhat larger than or equal to the height of the welding projections 27B,27Ba.

According to the present embodiment, the same effects as those of first embodiment can be also achieved. In the present embodiment, with no fitting structure between the welding groove and the abutting projection provided, the configurations of the terminal block 11B and the cover 13B can be made simpler.

Third Embodiment

Figure 7:
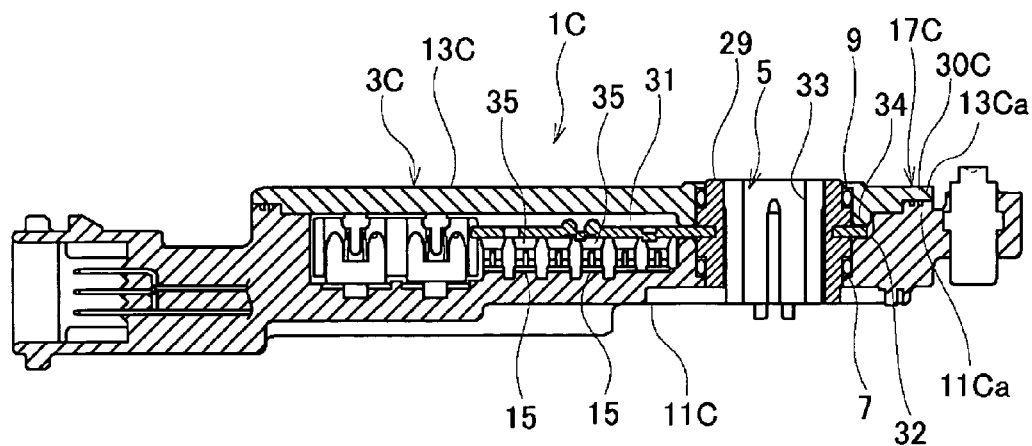
FIG. 7 is a view showing an inhibitor switch in a third embodiment of the present invention.
Figure 8:
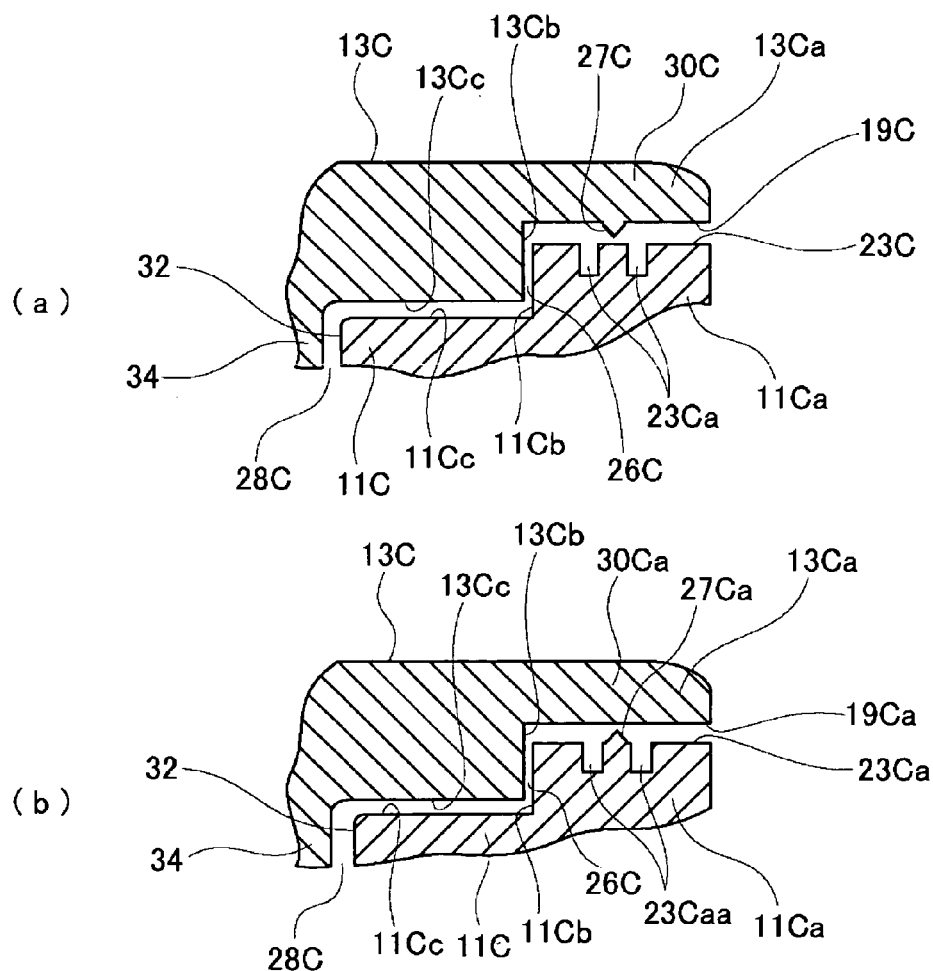
FIGS. 8(a) and 8(b) are enlarged partial views each showing a different example of a welding part before welding in the third embodiment.
Figure 9:
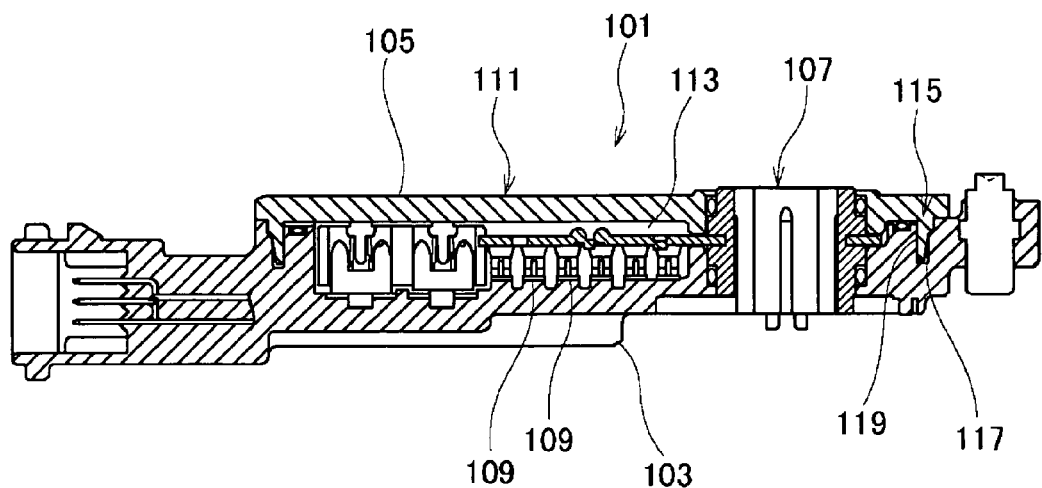
FIG. 9 is a view showing an inhibitor switch in the conventional art.

FIGS. 7, 8(a) and 8(b) are views illustrating a third embodiment and FIG. 7 is a cross sectional view showing an inhibitor switch. FIGS. 8(a) and 8(b) are enlarged partial cross sectional views each showing a different example of the welding part before welding. It should be noted that the fundamental structure in the third embodiment is identical to that of the second embodiment. Components the same as or identical to those in the second embodiment are referred to as identical numbers or identical numbers with "C" instead of "B" and the same explanation is omitted.

Welding clearance grooves 23Ca, 23Caa are additionally formed in an inhibitor switch 1C according to the present embodiment as shown in FIGS. 8(a) and 8(b) to the structure of the second embodiment.

In the present embodiment, the welding projections 27C, 27Ca melted by irradiation of a laser beam can enter into the welding clearance grooves 23Ca, 23Caa. Accordingly, the melted resin material is prevented from running off from between the cover abutting surface 19C and the terminal block abutting surface 23C, as well as from between the cover abutting surface 19Ca and the terminal block abutting surface 23Ca, achieving a high level of sealing properties and improving the appearance of the switch.

Other Embodiments

It may be also possible to use a laser transmissive material as the terminal blocks 11, 11B, or 11C, and to use a laser non-transmissive material as the covers 13, 13B, or 13C. In this case, the thin part is formed on the side of the terminal blocks 11, 11B, or 11C.

It should be noted that the terminal block has many functions and constructions such as a detection mechanism as the fixed contact points or the like, a mounting part of the automatic transmission, and a connector for taking out detection signals. On the other hand, since the cover has less functions to be achieved, it is preferable that the cover is formed of the laser transmissive material in terms of increasing degrees of freedom in selecting materials and in designing.

The welding projection 27, 27a, 27B, 27Ba, 27C, or 27Ca may be formed in plurality and they may be omitted.

In each of the embodiments, a detector composed of fixed contact points and movable contact points is exemplified. However, the embodiment may be likewise applied to a switch having a non-contact detector formed of a combination of a magnet and a magnetic sensor or a light emitting element and a light receiving element.

While only the selected embodiments have been chosen to illustrate the present invention, it will be apparent to those skilled in the art from this disclosure that various changes and modifications can be made therein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A switch comprising:
   a switch housing including a cover and a terminal block coupled with the cover a moving block provided with an operation portion and movable to the switch housing; and
   a detector for detecting a movement of the operation portion between the switch housing and the moving block, wherein:
   one of the cover or the terminal block is formed of a colored, laser transmissive material and the other is formed of a laser non-transmissive material;
   a thin part is circularly formed in the cover or the terminal block formed of the colored laser transmissive material on the periphery side of the switch housing and is thinner than another part of the cover or the terminal block; and
   a thermal welding part is circularly formed on the thin part by means of a laser beam for coupling the terminal block with the cover.

2. The switch according to claim 1, wherein:
   the thin part is formed of a welding groove circularly formed in one of the cover or the terminal block, further comprising:
   a projecting rib fitting in the welding groove circularly formed in the other of the cover or the terminal block, wherein:
   the thermal welding part is formed between the welding groove and the projecting rib.

3. The switch according to claim 2, wherein:
   the thin part has a thickness larger than or equal to 1 mm and less than or equal to 2 mm.

4. The switch according to claim 2, wherein:
   the switch includes an inhibitor switch for detecting the shift position of an automatic transmission; and
   the operation portion forms an abutting part to a manual shaft of the automatic transmission.

5. The switch according to claim 1, wherein:
   the thin wall part is formed of a stepped part circularly formed in one of the cover or the terminal block, further comprising:
   a projection opposed to the stepped part circularly formed in the other of the cover or the terminal block, wherein:
   the thermal welding part is formed between the stepped part and the projection.

6. The switch according to claim 5, wherein:
   the thin part has a thickness larger than or equal to 1 mm and less than or equal to 2 mm.

7. The switch according to claim 5, wherein:
   the switch includes an inhibitor switch for detecting the shift position of an automatic transmission; and
   the operation portion forms an abutting part to a manual shaft of the automatic transmission.

8. The switch according to claim 1, wherein:
   the thin part has a thickness larger than or equal to 1 mm and less than or equal to 2 mm.

9. The switch according to claim 8, wherein:
   the switch includes an inhibitor switch for detecting the shift position of an automatic transmission; and
   the operation portion forms an abutting part to a manual shaft of the automatic transmission.

10. The switch according to claim 1, wherein:
    the switch includes an inhibitor switch for detecting the shift position of an automatic transmission; and
    the operation portion forms an abutting part to a manual shaft of the automatic transmission.

11. A welding method of a switch provided with a switch housing including a cover and a terminal block coupled with the cover, a moving block provided with an operation portion and movable to the switch housing, and a detector for detecting a movement of the operation portion between the switch housing and the moving block, comprising:
    forming one of the cover or the terminal block with a colored, laser transmissive material and the other with a laser non-transmissive material;
    disposing a thin part circularly in the cover or the terminal block formed of the colored laser transmissive material on the periphery side of the switch housing and thinner than another part of the cover or the terminal block; and providing a thermal welding circularly between the terminal block and the cover by irradiating a laser beam on the thin part for coupling the terminal block with the cover.

12. The welding method according to claim 11, further comprising:

forming a welding projection at a position opposed to the thin part on the side of the cover or the terminal block;

contacting the welding projection with the opposed side of the cover or the terminal block; and irradiating a laser beam along the thin part to melt the welding projection for thermal welding.

13. The weld method according to claim 12, wherein:

a welding clearance groove is formed adjacent to the position of the welding projection on at least one side of the cover or the terminal block.

* * * * *